(12) United States Patent
Lee et al.

(10) Patent No.: US 8,428,843 B2
(45) Date of Patent: Apr. 23, 2013

(54) METHOD TO ADAPTIVELY CONTROL VEHICLE OPERATION USING AN AUTONOMIC VEHICLE CONTROL SYSTEM

(75) Inventors: Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 672 days.

(21) Appl. No.: 12/630,113

(22) Filed: Dec. 3, 2009

(65) Prior Publication Data
US 2010/0082195 A1 Apr. 1, 2010

Related U.S. Application Data

(63) Continuation-in-part of application No. 12/143,439, filed on Jun. 20, 2008, now Pat. No. 8,170,739.

(60) Provisional application No. 61/157,950, filed on Mar. 6, 2009.

(51) Int. Cl.
*G05D 1/00* (2006.01)
*B60W 30/14* (2006.01)
*B62D 6/00* (2006.01)

(52) U.S. Cl.
USPC ............... 701/93; 701/58; 701/68; 701/70; 180/282

(58) Field of Classification Search ............ 701/25, 701/58, 68, 70, 93; 180/282; *G05D 1/00; B60W 30/14; B62D 6/00*
See application file for complete search history.

(56) References Cited

U.S. PATENT DOCUMENTS

| | | | | |
|---|---|---|---|---|
| 5,629,851 A * | 5/1997 | Williams et al. | ................. | 701/96 |
| 5,719,565 A * | 2/1998 | Tsuno et al. | ................... | 340/905 |
| 5,742,918 A * | 4/1998 | Ashrafi et al. | ................... | 701/70 |
| 6,130,608 A * | 10/2000 | McKeown et al. | ............ | 340/438 |
| 6,226,592 B1 * | 5/2001 | Luckscheiter et al. | ........ | 701/301 |
| 6,301,542 B1 * | 10/2001 | Kirchberger et al. | ........... | 701/93 |
| 6,370,469 B1 * | 4/2002 | Phung et al. | .................... | 701/93 |
| 6,374,173 B1 * | 4/2002 | Ehlbeck | .......................... | 701/93 |
| 7,051,827 B1 * | 5/2006 | Cardinal et al. | .............. | 180/174 |
| 7,124,027 B1 * | 10/2006 | Ernst et al. | ..................... | 701/301 |
| 7,363,140 B2 * | 4/2008 | Ewerhart et al. | ................ | 701/96 |
| 7,698,032 B2 * | 4/2010 | Matsumoto et al. | ............ | 701/36 |
| 7,725,261 B2 * | 5/2010 | Sekiguchi | ........................ | 701/301 |
| 2002/0041229 A1 * | 4/2002 | Satoh et al. | .................... | 340/438 |
| 2002/0049539 A1 * | 4/2002 | Russell et al. | ................. | 701/301 |
| 2004/0193374 A1 * | 9/2004 | Hac et al. | ........................ | 701/301 |
| 2005/0125153 A1 * | 6/2005 | Matsumoto et al. | ........... | 701/300 |
| 2007/0005218 A1 * | 1/2007 | Ueyama | ........................... | 701/96 |
| 2008/0300766 A1 * | 12/2008 | Kumabe et al. | .................. | 701/98 |

FOREIGN PATENT DOCUMENTS

| JP | 08194882 A * | 7/1996 |
|---|---|---|
| JP | 2001010433 A * | 1/2001 |

\* cited by examiner

*Primary Examiner* — Tuan C. To

(57) ABSTRACT

A vehicle includes a vehicle monitoring system for estimating vehicle motion states, a spatial monitoring system, an adaptive cruise control system for vehicle speed and acceleration control, a steering controller for vehicle lateral motion control, a roadway estimator, and an autonomic control system. Commanded vehicle operation is adjusted to achieve a preferred travel path based upon a predicted travel path and an estimated roadway. The preferred travel path is adapted responsive to the estimated roadway.

16 Claims, 9 Drawing Sheets

METHOD TO ADAPTIVELY CONTROL VEHICLE OPERATION USING AN AUTONOMIC VEHICLE CONTROL SYSTEM

CROSS REFERENCE TO RELATED APPLICATIONS

This application is a continuation-in-part of U.S. application Ser. No. 12/143,439 filed on Jun. 20, 2008, and also claims the benefit of U.S. Provisional Application No. 61/157,950 filed on Mar. 6, 2009, both which are incorporated herein by reference.

TECHNICAL FIELD

This disclosure relates generally to a system and method for providing path generation for lane centering and lane changes in an autonomously driven vehicle.

BACKGROUND

The operation of modern vehicles is becoming more autonomous, i.e., the vehicles are able to provide driving control with less and less operator intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where the system maintains the set speed and also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

Smooth maneuvering and automated lane centering and lane changing control is desirable for driver and passenger comfort in autonomous vehicles. However, as a result of sensor and actuator latency, measured vehicle states may be different from actual vehicle states. This difference may cause undesirable path generation, which may affect lane changing harshness.

SUMMARY

A vehicle includes a vehicle monitoring system for estimating vehicle motion states, a spatial monitoring system, an adaptive cruise control system for vehicle speed and acceleration control, a steering controller for vehicle lateral motion control, and an autonomic control system. A, method for operating the vehicle in response to an operator request for a lane change maneuver includes generating a preferred travel path responsive to the operator request for a lane change maneuver, using the autonomic control system to command vehicle operation to achieve the preferred travel path, determining vehicle motion states, predicting a travel path associated with the vehicle motion states, adjusting the commanded vehicle operation to achieve the preferred travel path based upon the predicted travel path, estimating a roadway using the spatial monitoring system, and adapting the preferred travel path responsive to the estimated roadway.

DETAILED DESCRIPTION

The following disclosure is directed to a system and method for providing path generation for smooth lane centering or lane changing in an autonomous or semi-autonomous vehicle is merely exemplary in nature, and is in no way intended to limit the disclosure or its applications or uses. As used herein, control module, controller, processor and similar terms refer to Application Specific Integrated Circuit(s) (ASIC), electronic circuit(s), a central processing unit(s) (preferably microprocessor(s)) and associated memory and storage (read only, programmable read only, random access, hard drive, etc.) or any suitable form including various combinations of the preceding, executing one or more software or firmware programs, combinational logic circuit(s), input/output circuit(s) and devices, appropriate signal conditioning and buffer circuitry, and other suitable components to provide the described functionality. A control module, controller or processor has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 1:
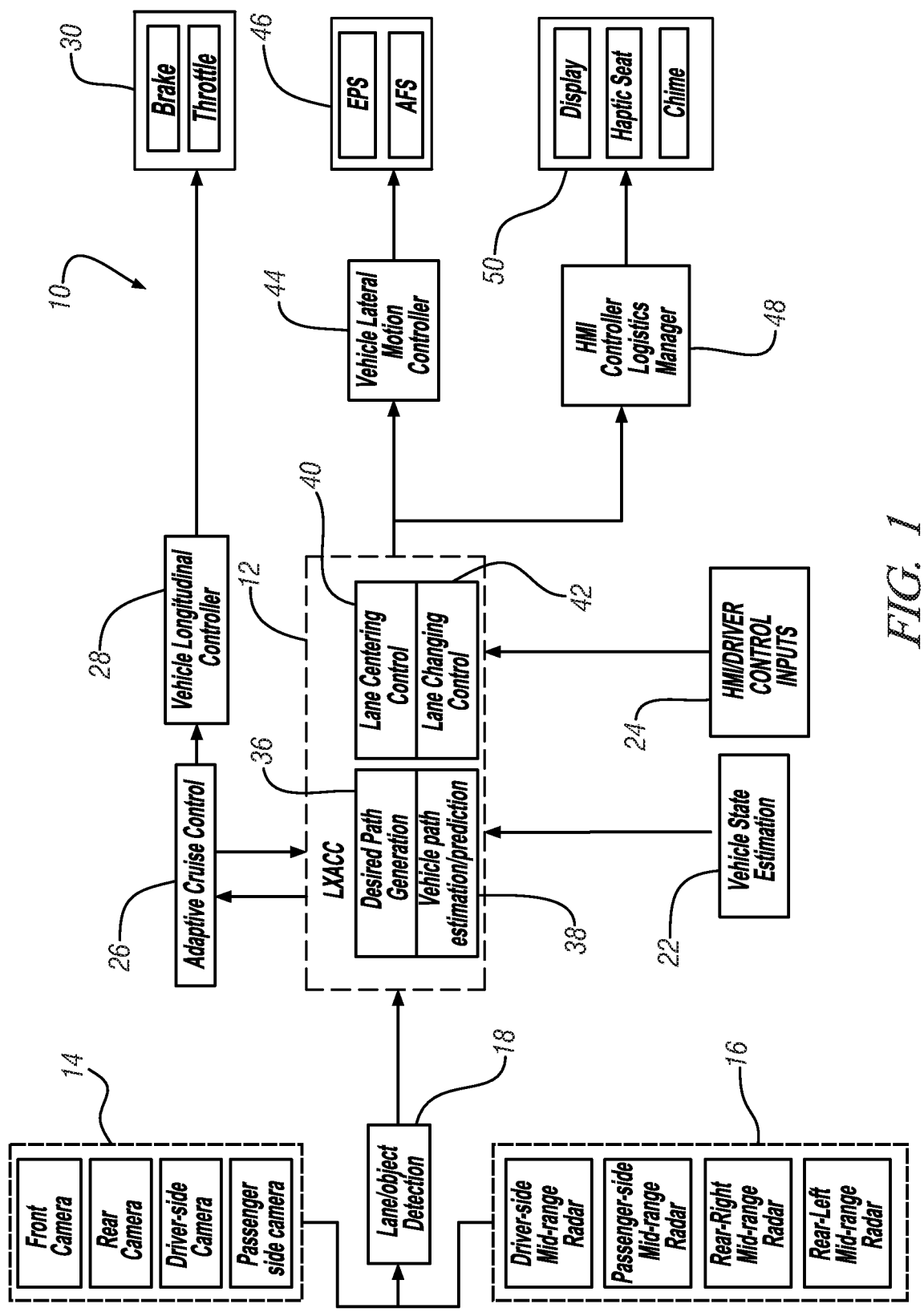
FIG. 1 is a schematic block diagram of various systems and sub-systems in an autonomous or semi-autonomous vehicle, including a lane change adaptive cruise control (LXACC) system in accordance with the present disclosure.

FIG. 1 is an illustration of a vehicle system 10 including an LXACC core algorithm 12 that includes path generation, as will be discussed in detail below. Known LXACC systems provide a unified framework for automated lateral motion controls, such as automated lane changing and lane centering functions. Because the lateral dynamics of a vehicle are related to its longitudinal motion, the longitudinal motion control is usually considered in the same framework.

The vehicle system 10 includes various cameras 14 and various radar devices 16 that detect lane marks and objects. This information is provided to a lane and object detection processor 18 that combines the detected objects and lane information. The lane and object detection information is provided to the LXACC core algorithm 12. Additionally, vehicle state estimation information at box 22 is also provided to the LXACC core algorithm 12, such as vehicle yaw rate, vehicle heading angle, and vehicle speed. Human machine interface (HMI)/driver control inputs at box 24 are provided to the LXACC core algorithm 12 for providing driver commands. Signals from an adaptive cruise control (ACC) subsystem 26 are provided to the LXACC core algorithm 12 and signals from the LXACC core algorithm 12 are provided to the ACC sub-system 26. The ACC sub-system 26 provides adaptive cruise control signals to a vehicle longitudinal controller 28 that in turn controls vehicle braking and throttle at box 30.

The LXACC core algorithm 12 includes a desired path generation processor 36 that generates a desired vehicle path. The LXACC core algorithm 12 also includes a vehicle path estimation and prediction processor 38 that estimates a vehicle path. Signals from the processors 36 and 38 are provided to lane centering control module 40 and lane changing control module 42. The vehicle control signals from the LXACC core algorithm 12 are provided to a vehicle lateral motion controller 44 that controls an active front steering (AFS) or electrical power steering (EPS) at box 46. Further, the lane centering control and lane changing control signals are provided to an HMI controller and logistics manager 48 to inform the driver of the LXACC status using a display unit, haptic seat or warning chimes at box 50.

The path planning produces an achievable desired path for smooth lane changing maneuvers. The vehicle lateral motion controller 44 uses the predicted lateral offsets and vehicle heading angles, and compares them with the desired trajectory at multiple look-ahead points. The vehicle lateral motion controller 44 generates the steering angle command at each time step. A forward vision camera is used for the lane mark detection. The lateral offset and the vehicles heading angle with respect to the current lane are obtained by processing the lane marks recognized, and further predicted over the pre-defined lane change operation time. Several inertial sensors, such as rate gyros and accelerometers, can be combined with the vision camera to estimate the vehicles motion states, such as yaw-rate and lateral speed, as well as to improve the estimation of the lateral offset and the heading angle.

The smoothness of the lateral motion is one important measure of the LXACC core algorithm 12 performance. The path-planning function generates the desired paths. The paths should satisfy the vehicles dynamic capability and be smooth. The design consideration proposed herein is to generate the desired path without an abrupt change in the sense of the vehicles second order dynamic motion. Further complication in the path planning is that the vehicle will reach the target state from any initial state. There are many approaches in the literature to solve this problem, which are based on different assumptions about the hardware and the environment.

Figure 2:
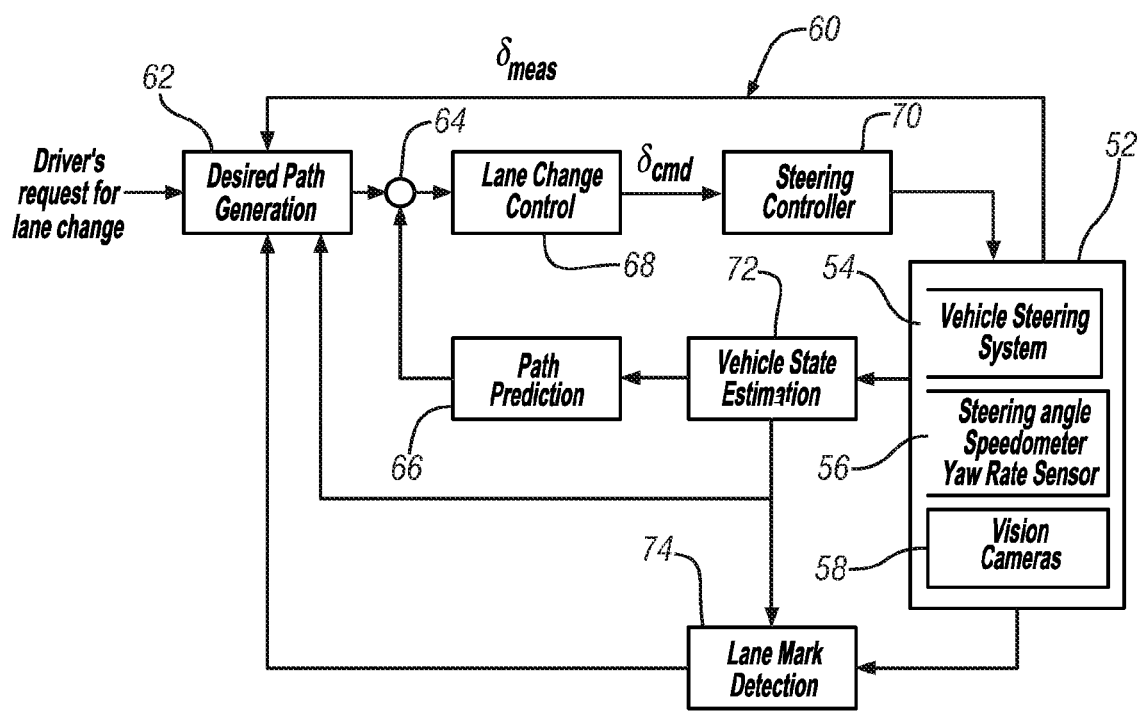
FIG. 2 is a block diagram of a path prediction system used in the LXACC system shown in FIG. 1 in accordance with the present disclosure.

FIG. 2 is a schematic block diagram of an LXACC system 60 that provides a desired path for the vehicle to follow when changing lanes, either on a straight road or a curved road, and that provides lane centering in an autonomous or semi-autonomous vehicle system, such as the system 10 shown in FIG. 1. The LXACC system 60 includes a desired path generation processor 62 that receives a driver's request for lane change from, for example, the inputs from the box 24 in FIG. 1. As will be discussed in detail below, the desired path generation processor 62 generates a smooth path for the vehicle when turning that does not have abrupt changes that would otherwise provide passenger discomfort. The LXACC system 60 produces a steering angle command to guide the vehicle along the generated path.

The desired path is represented as a series of lateral offsets, heading angles and longitudinal distances over a time period that the lane change will take place. This path information is provided to a comparator 64 that receives a signal from a path prediction processor 66 and provides an error signal between the desired path and the predicted path. The error signal is applied to a lane change controller 68 that provides a steering angle command signal $\delta_{cmd}$ for the lane change. The lane change controller 68 generates a sequence of future steering angle commands that minimize the orientation and offset errors between the vehicles desired path and the predicted vehicle path.

The steering angle command signal $\delta_{cmd}$ is then sent to a steering controller 70 that provides the steering control signal to a vehicle steering system 54 on a vehicle 52. As the vehicle turns, various sensors 56 on the vehicle, such as a steering angle sensor, speedometer and yaw rate sensor, provide measured signals of the vehicle motion. These measured vehicle motion signals $\delta_{meas}$ are sent back to the desired path generation processor 62. The vehicle 52 also includes vision devices 58, such as cameras. The vehicle motion information is provided to a vehicle state estimation processor 72 that provides estimated vehicle state signals, namely, vehicle longitudinal speed, vehicle lateral speed and vehicle yaw-rate. The vehicle state estimation processor 72 uses a vehicle model to filter the estimated vehicle state signals. The state signals are sent to the path prediction processor 66 that will be able to predict the vehicle path for the next few instances in time based on that information. The path prediction processor 66 estimates the vehicle future path based on the current vehicle speed, yaw-rate and steering angle.

The camera signals from the vision devices 58 and the filtered sensor signals from the processor 72 are provided to a lane mark detection processor 74 that corrects the parameters of the lane markings from the devices 58 based on the motion of the vehicle. The lane mark detection processor 74 recognizes the lane marking and represents them with the parameters of lane curvature, tangential angle and lateral offset, where the output of the lane mark detection processor 74 is a heading angle and curvature of the road. The position of the lane markings relative to the vehicle is then sent to the desired path generation processor 62 to provide the desired path generation updating. The desired path generation processor 62 generates a smooth desired path for a lane change according to the vehicle dynamics and the detected lane marks.

Figure 3:
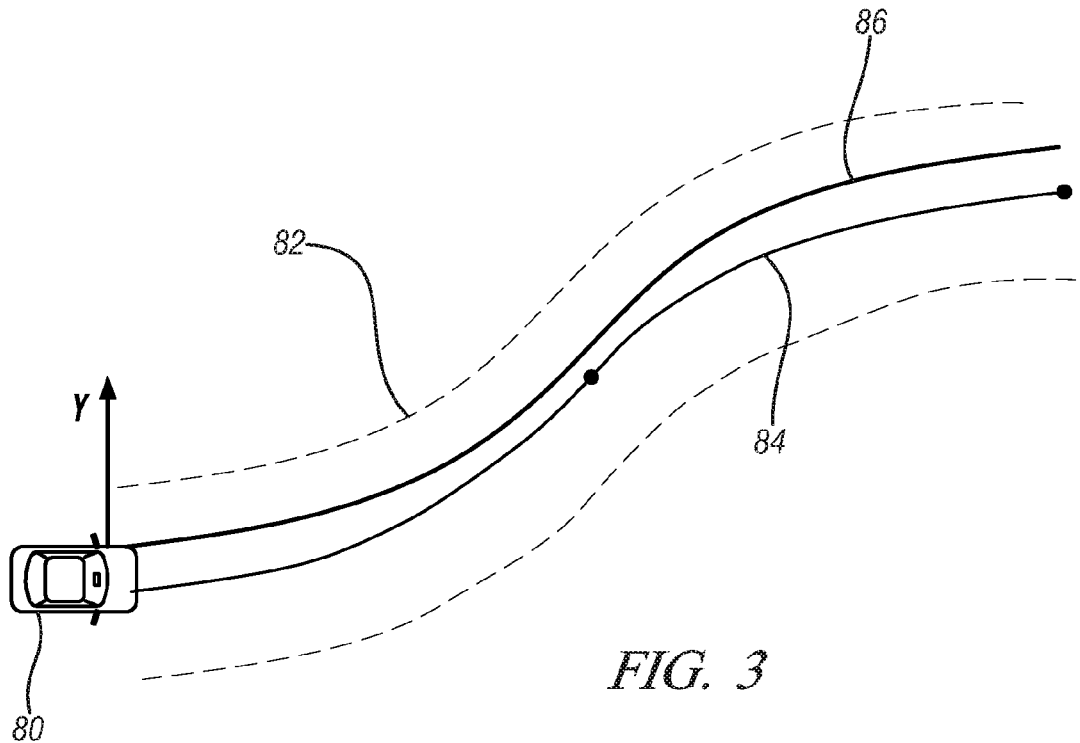
FIG. 3 is an illustration of a vehicle traveling on the roadway showing a predicted lane center and a detected lane center in accordance with the present disclosure.

FIG. 3 is an illustration of a vehicle 80 traveling on a roadway 82 showing a detected lane center 84 that is identified by the vehicle cameras and other sensors, and a predicted lane center 86 that is generated by the path prediction processor 66. The latency of the detector and the steering actuator causes a discrepancy between the measured vehicle states and the actual vehicle states. The following discussion provides a description as to how the path prediction processor 66 predicts the path of the vehicle, and then how that predicted path is used to generate the error signal between the predicted path 86 and the detected lane center 84, as discussed above.

There are certain situations where multiple paths need to be predicted if an obstacle, such as another vehicle, is detected in the path of the vehicle 80. The present disclosure treats that situation in multiple segments where a first segment is from the vehicle 80 to the obstacle and a second segment is from the obstacle and beyond. The present disclosure provides continuity between the segments to avoid abrupt changes in vehicle motion.

According to one embodiment, the desired path generation processor 62 generates the desired path based on the predicted lane center, and uses a fifth order polynomial equation, as will be discussed in detail below. The fifth order polynomial equation has six unknowns at the beginning of the process for calculating the desired path. The normalized path problem is independent of the vehicle states, where the vehicle states will be used at the stage of the coordinate conversion for normalized coordinates to vehicle coordinates. The continuity requirement for the segment can be easily accommodated into the algorithm when multiple segments need to be concatenated.

Figure 4:
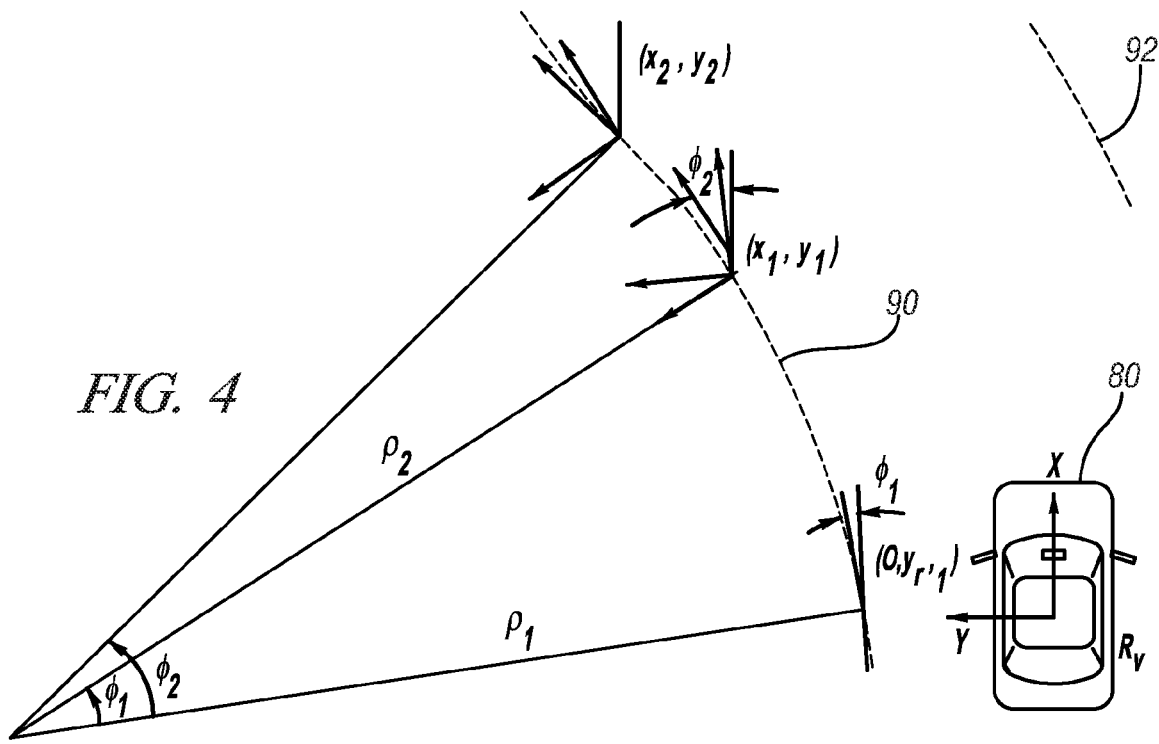
FIG. 4 is an illustration of a vehicle traveling on a roadway showing various vehicle parameters in accordance with the present disclosure.

The vehicle 80 is equipped with a forward vision camera that detects lane marks of the roadway 82 and represents the lane marks in polynomial equations. The vision system is responsible for recovering estimates of the position and orientation of the lane with respect to the center of the vehicle. FIG. 4 shows the vehicle 80 traveling on a curve 90 of a roadway 92. The roadway 92 is modeled as two segments of second order polynomial equations as follows $$y_{seg1}(x) = A_1 x^2 + B_1 x + C_1, \quad 0 < x < x_1 \quad [1]$$

$$y_{seg2}(x) = A_2 x^2 + B_2 x + C_2, \quad 0 < x < x_2 \quad [2]$$

where $x_1$ and $x_2$ represent the end points along the x-axis of the first segment and the second segment $y_{seg1}$ and $y_{seg2}$ represents the lateral offset of the roadway with respect to the vehicle coordinate system $R_v(t)$. The measurements provided by the vision system include yaw angle $\phi_{r,1}$ of the vehicle 80 with respect to the first segment of the roadway, lateral offset $y_{r,1}$ of the vehicle's center of gravity from the lane, and roadway curvature $\rho_1$ and $\rho_2$ of the first segment and the second segment.

From the geometric relationship between roadway and the lane representation, the coefficients of Eqs. 1 and 2 can be related as follows.

$$A_1 = \frac{\rho_1}{2} \quad [3]$$

$$A_2 = \frac{\rho_2}{2} \quad [4]$$

$$B_1 = \tan\varphi_1 \quad [5]$$

$$C_1 = y_{r,1} \quad [6]$$

It is assumed that the roadway runs without discontinuity, that is, the two segments of each road representation connect smoothly without an abrupt change at the transition point $x_1$. Only the zeroth and first order continuity are assumed herein, so Eqs. 7 and 8 below hold at the transition point $x_1$ as follows.

$$y_{seg1}(x_1) = y_{seg2}(x_1) \quad [7]$$

$$\left.\frac{dy_{seg1}}{dx}\right|_{x=x1} = \left.\frac{dy_{seg2}}{dx}\right|_{x=x1} \quad [8]$$

Substituting Eqs. 3-8 into Eqs. 1 and 2 provides the following.

$$C_2 = y_{seg1}(x_1) \quad [9]$$

$$B_1 = 2A_1 x_1 + B_1 \quad [10]$$

By integrating Eqs. 3-6, 9, and 10, Eqs. 1 and 2 can be rewritten in terms of the measurements of the vision system as follows.

$$y_{seg1}(x) = \frac{\rho_1}{2}x^2 + \tan(\varphi_1)x + y_{r,1}, \quad 0 < x < x_1 \quad [11]$$

$$y_{seg2}(x) = \frac{\rho_2}{2}x^2 + (\rho_1 \cdot x_1 + \tan(\varphi_1))x + y_{seg1}(x_1), \quad [12]$$
$$x_1 < x < x_2$$

Assuming that the vehicle 80 is running at a longitudinal speed $v_x$ and there are no obstacles in the roadway, then the driver/passengers comfort depends on the vehicle's lateral acceleration $a_y$ and the lateral acceleration $a_y$ is a function of the vehicle speed $v_x$ and the steering angle $\delta$. A time variable $t_{LX}$ is specified to complete a lane change maneuver independent of vehicle longitudinal speed unless the calculated lateral acceleration $a_y$ is predicted to be over a certain limit during the lane change maneuvering. If the lateral acceleration $a_y$ is over the limit, a new path is calculated with a new extended lane change maneuvering time.

The vehicle longitudinal speed $v_x$ is measured by the vehicle speedometer, and the lateral offset, heading angle and roadway curvature $\rho$ are measured by the forward vision system. The desired path generation is formulated for the lane change maneuvering as a boundary condition problem. Assume that the lane change control begins at t=0 and define (x(t), y(t)) as the vehicle position at time t with respect to the origin $R_v(0)$ coordinate system.

Figure 5:
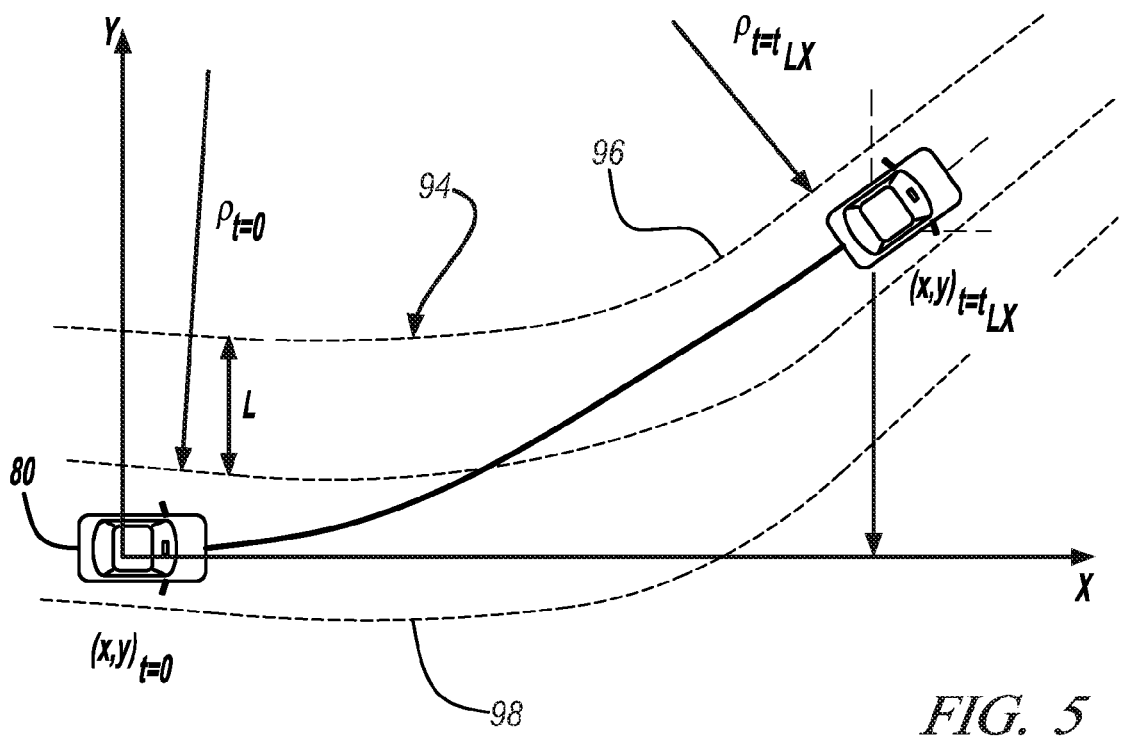
FIG. 5 is an illustration of a vehicle changing lanes around a curve in accordance with the present disclosure.

FIG. 5 is an illustration of the vehicle 80 traveling on a roadway 94 around a curve 96, and identifies boundary conditions for the desired path generation. Note that the coordinates system $R_v(0)$ is the vehicle coordinate system captured at time t=0 and the position and the heading angle of the vehicle 80 at t=0 are aligned with $R_v(0)$. Thus (x(t=0, y(t=0))= (0,0) and y'(0)=0 can be set without loss of generality.

The initial and final states (y, y', y")$_{t=0}$ and (y, y', y")$_{t=t_{LX}}$ of the vehicle 80 can then be obtained by manipulating the roadway representation Eqs. 11 and 12. The value (x($t_{LX}$), y($t_{LX}$)) corresponds to the desired position of the vehicle 80 at time $t=t_{LX}$, where $x(t_{LX})$ can be estimated by integrating the vehicle longitudinal speed $v_x$ and the value $y(t_{LX})$ can be obtained by the lane width and the roadway geometry. Note that $y_r$ in Eqs. 3-6 represents the lateral offset of the roadway from the center of the vehicle 80, and here y represents the vehicle location with respect to $R_v(0)$.

Selecting a fifth order polynomial equation for x and y positions of the vehicle 80 gives the following.

$$y(x) = a_5 x^5 + a_4 x^4 + a_3 x^3 + a_2 x^2 + a_1 x + a_0 \quad [13]$$

Considering the initial and final conditions gives the following.

$$(y(x), y'(x), y''(x))_{t=0} = (0, 0, y''_{seg1}(x(0))) \quad [14]$$

And, if $x_1 < x(t_{LX}) < x_2$, then $$(y(x), y'(x), y''(x))_{t=t_{LX}} = \begin{cases} \begin{pmatrix} y_{seg1}(x(t_{LX})), \\ y'_{seg1}(x(t_{LX})), \\ y''_{seg1}(x(t_{LX})) \end{pmatrix}, \\ \text{if } 0 < x(t_{LX}) < x_1 \\ \begin{pmatrix} y_{seg2}(x(t_{LX})), \\ y'_{seg2}(x(t_{LX})), \\ y''_{seg2}(x(t_{LX})) \end{pmatrix}, \\ \text{if } x_1 < x(t_{LX}) < x_2 \end{cases} \quad [15]$$

The problem can be solved by the following linear equation.

$$\begin{bmatrix} a_0 \\ a_1 \\ a_2 \\ a_3 \\ a_4 \\ a_5 \end{bmatrix} = \begin{bmatrix} 1 & x(0) & x^2(0) & x^3(0) & x^4(0) & x^5(0) \\ 0 & 1 & 2x(0) & 3x^2(0) & 4x^3(0) & 5x^4(0) \\ 0 & 0 & 2 & 6x(0) & 12x^2(0) & 20x^3(0) \\ 1 & x(t_{LX}) & x^2(t_{LX}) & x^3(t_{LX}) & x^4(t_{LX}) & x^5(t_{LX}) \\ 0 & 1 & 2x(t_{LX}) & 3x^2(t_{LX}) & 4x^3(t_{LX}) & 5x^4(t_{LX}) \\ 0 & 0 & 0 & 6x(t_{LX}) & 12x^2(t_{LX}) & 20x^3(t_{LX}) \end{bmatrix}^{-1} \quad [16]$$

$$\begin{bmatrix} y(x(0)) \\ y'(x(0)) \\ y''(x(0)) \\ y(x(t_{LX})) \\ y'(x(t_{LX})) \\ y''(x(t_{LX})) \end{bmatrix}$$

The path generation problem can be simplified by normalization of the coordinate. Denoting the normalized coordinates as $(x_n(t), y_n(t))$ gives the following.

$$x_n(t) = \frac{x(t)}{x(t_{LX})} \quad [17]$$

$$y_n(x(t)) = \frac{y(x(t))}{y(x(t_{LX}))} \quad [18]$$

Substituting Eqs. 17 and 18 into Eq. 13 and redefining the coefficients of the polynomial equation, can be obtained by the following equation.

$$y_n(x_n) = a_{n,5} x_n^5 + a_{n,4} x_n^4 + a_{n,3} x_n^3 + a_{n,2} x_n^2 + a_{n,1} x_n + a_{n,0} \quad [19]$$

Applying the normalized coordinates of Eqs. 17 and 18 into the initial and final conditions, the normalized coordinates can be rewritten to the conditions as follows.

$$(y_n(x_n), y'(x_n)_n, y''(x_n)_n)_{t=0} = \left(0, 0, y''_{seg1}(x(0)) \cdot \frac{x^2(t_{LX})}{y(t_{LX})}\right) \quad [20]$$

$$(y_n(x_n), y'(x_n)_n, y''(x_n)_n)_{t=t_{LX}} = \begin{cases} \begin{pmatrix} 1, y'_{seg1}(x(t_{LX})) \cdot \\ \frac{x(t_{LX})}{y(t_{LX})}, \\ y''_{seg1}(x(t_{LX})) \cdot \\ \frac{x^2(t_{LX})}{y(t_{LX})}, \end{pmatrix} \\ \text{if } 0 < x < x_1 \\ \begin{pmatrix} 1, y'_{seg2}(x(t_{LX})) \cdot \\ \frac{x(t_{LX})}{y(t_{LX})}, \\ y''_{seg2}(x(t_{LX})) \cdot \\ \frac{x^2(t_{LX})}{y(t_{LX})}, \end{pmatrix} \\ \text{if } x_1 < x < x_2 \end{cases} \quad [21]$$

The linear equation problem of Eq. 16 can then be simplified as follows.

$$\begin{bmatrix} a_{n,0} \\ a_{n,1} \\ a_{n,2} \\ a_{n,3} \\ a_{n,4} \\ a_{n,5} \end{bmatrix} = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & 1 & 1 & 1 & 1 & 1 \\ 0 & 1 & 2 & 3 & 4 & 5 \\ 0 & 0 & 2 & 6 & 12 & 20 \end{bmatrix}^{-1} \begin{bmatrix} y_n(0) \\ y'_n(0) \\ y''_n(0) \\ y_n(1) \\ y'_n(1) \\ y''_n(1) \end{bmatrix} \quad [22]$$

Note that the roadway conditions are captured only by the y-vector, and the matrix is a constant matrix regardless of the initial condition, the final condition or the road geometry. Therefore, the solution of Eq. 22 can be obtained by a few simple algebraic computations. Once the solution is calculated, Eq. 19 represents the desired path to complete the current lane change maneuvering in normalized coordinates. Applying Eq. 18 can yield the desired path profile in the vehicle coordinates.

Recall the initial position of the vehicle $(x(t=0), y(t=0)) = (0,0)$ and the initial heading angle $y'(0)=0$ because the vehicle motion is described by the vehicle coordinate system captured at $t=0$, $R_v(0)$. In curved road cases, as shown in FIG. 5, the boundary conditions can be written as follows $$(y(x(0))y'(x(0))y''(x(0))) = (0\ 0\ y_{seg}''(0)) \quad [23]$$

$$(y(x(t_{LX}))y'(x(t_{LX}))y''(x(t_{LX}))) = (y_{seg}(x(t_{LX})) + Ly_{seg}'(x(t_{LX}))y_{seg}''(x(t_{LX}))) \quad [24]$$

where L is the lane width and $x(t_{LX})$ is the x-coordinate at time $t_{LX}$ that corresponds to the longitudinal distance of travel to complete the lane change maneuvering. The value $x(t_{LX})$ can be estimated by integrating the vehicle speed $v_x$.

In normalized form, the initial and final conditions are as follows.

$$(y_n(x_n = 0)y'_n(x_n = 0)y''_n(x_n = 0)) = \left(0\ 0\ y''_{seg}(0) \cdot \frac{x^2(t_{LX})}{y(x(t_{LX}))}\right) \quad [25]$$

$$(y_n(x_n = 1) y'_n(x_n = 1) y''_n(x_n = 1)) = \begin{pmatrix} 1 \ y'_{seg}(x(t_{LX})) \cdot \dfrac{x(t_{LX})}{y(x(t_{LX}))} \\ y''_{seg}(x(t_{LX})) \cdot \dfrac{x^2(t_{LX})}{y(x(t_{LX}))} \end{pmatrix} \quad [26]$$

Substituting Eqs. 25 and 26 into the linear Eq. 22 results in the following solution.

$$a_{n,0} = a_{n,1} = 0, \ a_{n,2} = 0.5 y''_{seg}(0) \cdot \dfrac{x^2(t_{LX})}{y(x(t_{LX}))} \quad [27]$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \dfrac{x^2(t_{LX})}{y(x(t_{LX}))} \\ y'_n(1) - 0.5 y''_{seg}(0) \cdot \dfrac{x^2(t_{LX})}{y(x(t_{LX}))} \\ y''_n(1) - 0.5 y''_{seg}(0) \cdot \dfrac{x^2(t_{LX})}{y(x(t_{LX}))} \end{bmatrix} \quad [28]$$

As seen in Eq. 28, the first two coefficients of the polynomial equation are always zero. Further the rest of the coefficients can be calculated with a few algebraic computations with the boundary conditions.

Figure 6:
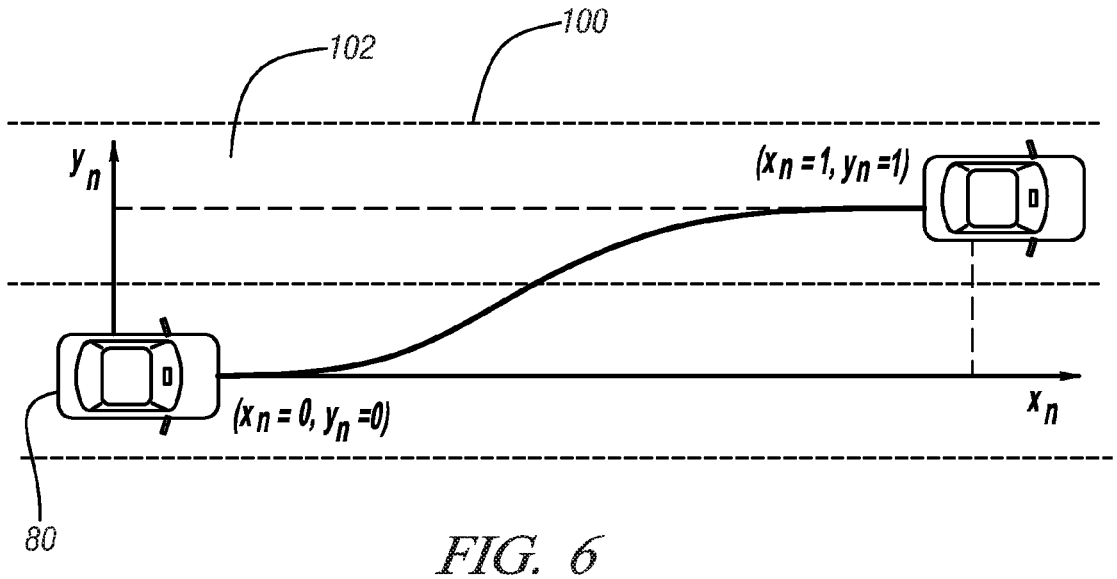
FIG. 6 is an illustration of a vehicle changing lanes on a straight roadway in accordance with the present disclosure.

For straight road cases, the path generation problem can be further simplified. FIG. 6 is an illustration of the vehicle 80 traveling in a lane 102 of a roadway 100 that is straight. The road curvature ρ is zero throughout the lane change maneuvering and the desired heading angle at the end of the lane change will be also zero. Thus, initial and final conditions are $$(y(x(0)) y'(x(0)) y''(x(0))) = (0 \ 0 \ 0) \quad [29]$$

$$(y(x(t_{LX})) y'(x(t_{LX})) y''(x(t_{LX}))) = (L \ 0 \ 0) \quad [30]$$

where L is the lane width.

In normalized form, the initial and final conditions can be written as follows.

$$(y_n(x_n=0) y_n'(x_n=0) y_n''(x_n=0)) = (0 \ 0 \ 0) \quad [31]$$

$$(y_n(x_n=1) y_n'=1) y_n''=1)) = (1 \ 0 \ 0) \quad [32]$$

Finally, substituting the conditions of Eqs. 31 and 32 in the linear equation leads to the following solution.

$$a_{n,0} = a_{n,1} = a_{n,2} = 0 \quad [33]$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) \\ y_n'(1) \\ y_n''(1) \end{bmatrix} = \begin{bmatrix} 10 \\ -15 \\ 6 \end{bmatrix} \quad [34]$$

As seen in Eq. 34, the coefficients of the polynomial equation for the straight road are constant regardless of the lane change maneuvering distance, that is, the desired path is predetermined and no online computation is needed for the lane change maneuvering for straight road circumstances.

In the discussion above, it was assumed that the forward vision system can detect the lane marks far enough to cover the entire travel distance needed for the lane change maneuvering. This assumption may not be valid in certain cases, in particular, for high speed of vehicle motion or uneven road conditions. Considering these cases, the roadway can be extrapolated with the first order continuity assumption.

Figure 7:
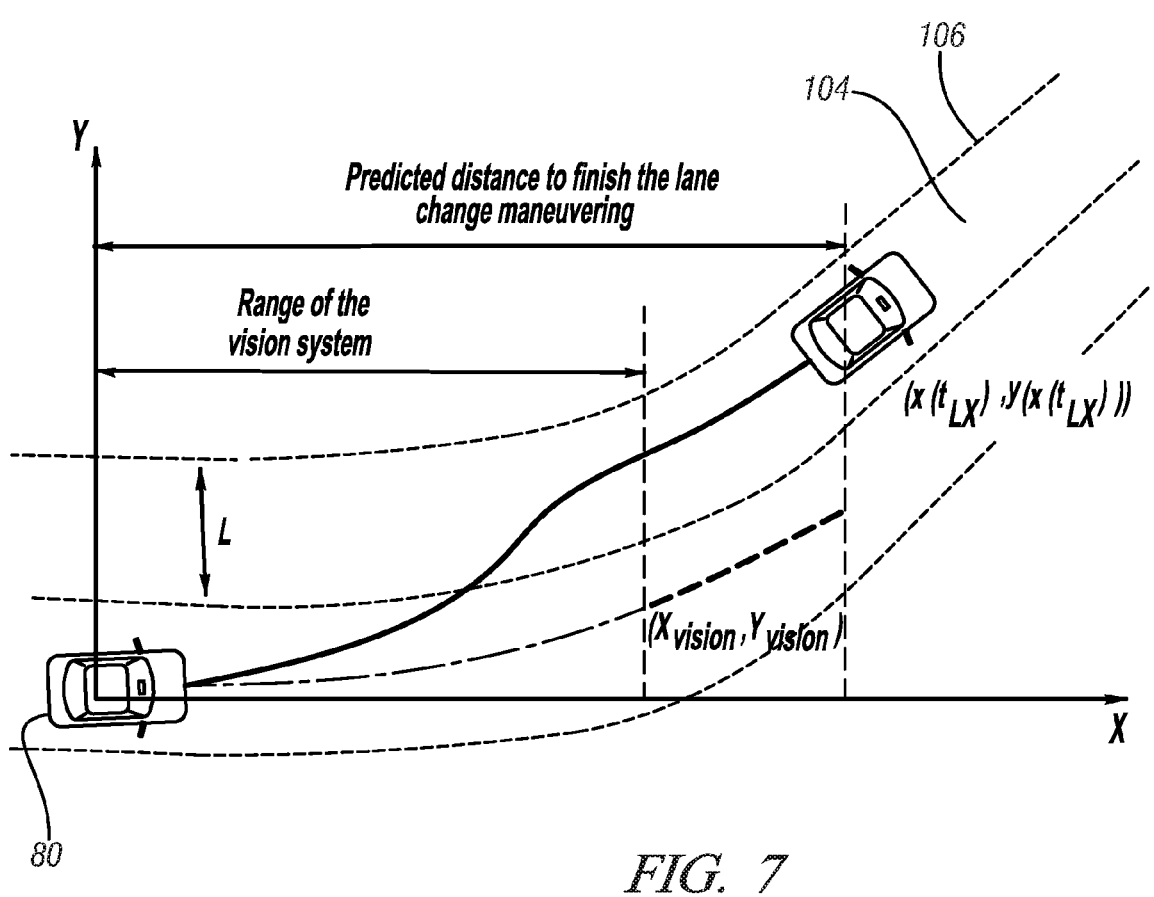
FIG. 7 is an illustration of a vehicle changing lanes on a curve in a roadway where a lane change would continue past a location where sensors in the vehicle can detect in accordance with the present disclosure.

FIG. 7 illustrates the vehicle 80 traveling in a lane 104 of a roadway 106 showing the scenario where the range of the vision system is limited so that the vision system is not able to see the entire travel distance needed for the lane change maneuvering.

Recall the roadway representation of Eqs. 11 and 12.

$$y_{seg1}(x) = \dfrac{\rho_1}{2} x^2 + \tan(\varphi_1) x + y_{r,1}, \quad 0 < x < x_1 \quad [35]$$

$$y_{seg2}(x) = \dfrac{\rho_2}{2} x^2 + (\rho_1 \cdot x_1 + \tan(\varphi_1)) x + y_{seg1}(x_1), \quad [36]$$

$$x_1 < x < x_2$$

The value $x_2$ is the end point of the second segment and corresponds to the range of the vision system. If $x_2 < x(t_{LX})$, that is the range of the vision system is shorter than the distance needed for the current lane change maneuver, then the roadway measurement can be extrapolated from $x_2$ to $x(t_{LX})$ with the first order continuity assumption. Then, the roadway 106 can be represented by the following three equations.

$$y_{seg1}(x) = \dfrac{\rho_1}{2} x^2 + \tan(\varphi_1) x + y_{r,1}, \quad \text{for } 0 < x < x_1 \quad [37]$$

$$y_{seg2}(x) = \dfrac{\rho_2}{2} x^2 + (\rho_1 \cdot x_1 + \tan(\varphi_1)) x + y_{seg1}(x_1), \quad [38]$$

for $x_1 < x < x_2$ $$y_{seg3}(x) = y'_{seg}(x_2) \cdot (x - x_2) + y_{seg}(x_2), \quad \text{for } x_2 < x < x(t_{LX}) \quad [39]$$

The first two segments are road representations based on the roadway measurement and the third segment is a virtual roadway extended with the continuity assumption. Considering the extended roadway representation, the initial and final conditions are obtained by the following.

$$(y(x(0)) y'(x(0)) y''(x(0))) = (0 \ 0 \ y_{seg1}''(0)) \quad [40]$$

$$(y(x(t_{LX})) y'(x(t_{LX})) y''(x(t_{LX}))) = (y_{seg}'(x_2) \cdot (x(t_{LX}) - x_2) + y_{seg2}(x_2) + L y_{seg}'(x_2) \ 0) \quad [41]$$

Normalized coordinates gives the following.

$$(y_n(x_n = 0) y_n'(x_n = 0) y_n''(x_n = 0)) = \left( 0 \ 0 \ y_{sseg1}''(0) \cdot \dfrac{x^2(t_{LX})}{y(x(t_{LX}))} \right) \quad [42]$$

$$(y_n(x_n = 1) y_n'(x_n = 1) y_n''(x_n = 1)) = \left( 1 \ y_{sseg2}''(x_2) \cdot \dfrac{x(t_{LX})}{y(x(t_{LX}))} \ 0 \right) \quad [43]$$

The polynomial coefficients of the desired path can be obtained by substituting the conditions of Eqs. 42 and 43 into Eq. 28 as follows.

$$a_{n,0} = a_{n,1} = a_{n,2} = 0.5 y''_{seg}(0) \cdot \dfrac{x^2(t_{LX})}{y(x(t_{LX}))} \quad [44]$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \frac{x^2(t_{LX})}{y(x(t_{LX}))} \\ y'_n(1) - 0.5 y''_{seg}(0) \cdot \frac{x^2(t_{LX})}{y(x(t_{LX}))} \\ -0.5 y''_{seg}(0) \cdot \frac{x^2(t_{LX})}{y(x(t_{LX}))} \end{bmatrix} \quad [45]$$

Note that the solution of the polynomial coefficients of Eq. 45 is obtained with the assumption of the first order continuity at the end, which means that the roadway is assumed as a straight road without a discontinuity after the sensor range. As the vehicle moves, the uncertainty of the roadway after the sensor range disappears and the path generated with the assumption is corrected corresponding to the detected roadway information.

Figure 8:
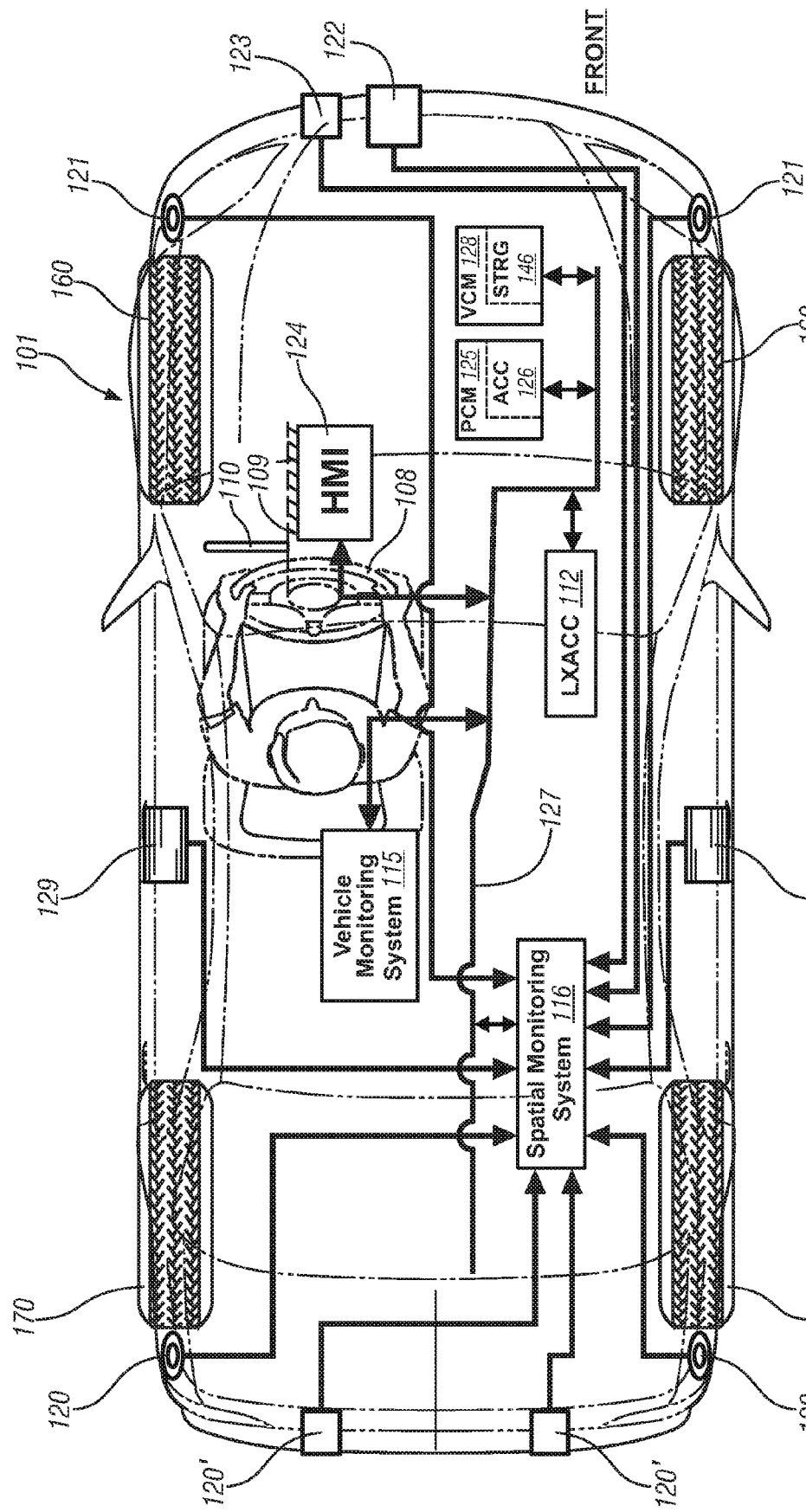
FIG. 8 schematically illustrates a subject vehicle including a spatial monitoring system, a vehicle monitoring system, and an autonomic control system including a lane change adaptive cruise control system in accordance with the present disclosure.

FIG. 8 schematically shows a subject vehicle 101 illustrative of the concepts described herein. The subject vehicle 101 includes a four-wheel passenger vehicle with steerable front wheels 160 and fixed rear wheels 170, although the concepts described herein apply to vehicles that are steerable using the front and/or the rear wheels. The subject vehicle 101 includes a spatial monitoring system 116 and a vehicle monitoring system 115. The subject vehicle 101 is controlled using a powertrain control module (PCM) 125, a vehicle control module (VCM) 128, and an autonomic control system including a LXACC system 112. The LXACC system 112 includes the functions of the LXACC system 12 described hereinabove and incorporates added functions. The PCM 125 includes an adaptive cruise control system (ACC) 126 that controls vehicle braking and acceleration to control vehicle speed and acceleration. The VCM 128 includes steering controller (STRG) 146 for vehicle lateral motion control. The spatial monitoring system 116, vehicle monitoring system 115, PCM 125, VCM 128, and the LXACC system 112 preferably communicate therebetween using a high-speed local area network communications bus 127. The spatial monitoring system 116, vehicle monitoring system 115, powertrain control module 125, vehicle control module 128, and the LXACC system 112 of the subject vehicle 101 are shown as discrete elements for ease of description. It should be appreciated that the functions described and performed by the discrete elements may be executed using one or more devices, e.g., implemented as algorithmic code, predetermined calibrations, hardware, and/or application-specific integrated circuitry (ASIC).

The spatial monitoring system 116 includes a control module signally connected to sensing devices operative to detect and generate digital images representing remote objects proximate to the subject vehicle 101. A remote object is said to be proximate to the subject vehicle 101 when the remote object can be detected by one or more of the sensing devices. The spatial monitoring system 116 preferably determines a linear range, relative speed, and trajectory of each proximate remote object and communicates such information to the LXACC system 112. The sensing devices are situated on the subject vehicle 101, and include front corner sensors 121, rear corner sensors 120, rear side sensors 120', side sensors 129, and front radar sensor 122, and a camera 123 in one embodiment, although the disclosure is not so limited. Preferably the camera 123 includes a monochrome vision camera used for detecting forward lane markings. The front radar sensor 122 preferably includes a long-range radar device for object detection in front of the subject vehicle 101. The front radar sensor 122 preferably detects objects at a distance up to 200 m with a narrow field of view angle of around 15° in one embodiment. Due to the narrow field of view angle, the long range radar may not detect all objects in the front of the subject vehicle 101. The front corner sensors 121 preferably include short-range radar devices to assist in monitoring the region in front of the subject vehicle 101, each having a 60° field of view angle and 40 m detection range in one embodiment. The side sensors 129, rear corner sensors 120 and rear side sensors 120' preferably include short-range radar devices to assist in monitoring oncoming traffic beside and behind the subject vehicle 101, each having a 60° field of view angle and 40 m detection range in one embodiment. Placement of the aforementioned sensors permits the spatial monitoring system 116 to monitor traffic flow including proximate object vehicles and other objects around the subject vehicle 101. Data generated by the spatial monitoring system 116 is used by the lane mark detection processor 74 to estimate the roadway.

Alternatively, the sensing devices can include object-locating sensing devices including range sensors, such as Frequency Modulated Continuous Wave (FM-CW) radars, pulse and Frequency Shift Keying (FSK) radars, and Light Detection and Ranging (Lidar) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other known camera/video image processors which utilize digital photographic methods to view forward objects including object vehicle(s). Such sensing systems are employed for detecting and locating objects in automotive applications and are useable with systems including adaptive cruise control, collision avoidance, pre-crash safety, and side-object detection.

The sensing devices are preferably positioned within the subject vehicle 101 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as "estimates." It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 115 preferably includes a plurality of on-board chassis monitoring sensing systems and devices for monitoring vehicle operation to determine vehicle motion states that are communicated to the communications bus 127. The vehicle motion states preferably include, e.g., vehicle speed, steering angle of the steerable wheels 160, and yaw rate. The on-board chassis monitoring sensing systems and devices include inertial sensors, such as rate gyros and accelerometers. The vehicle monitoring system 115 estimates the vehicle motion states, such as yaw-rate and lateral speed, and estimates lateral offset and heading angle of the subject vehicle 101. The measured yaw rate is combined with steering angle measurements to estimate the vehicle state of lateral speed. The vehicle monitoring system 115 generates signals associated with the vehicle motion states that can be monitored by the LXACC system 112 and other vehicle control systems for vehicle control and operation. The exemplary vehicle system may also include a global position sensing (GPS) system.

The powertrain control module (PCM) 125 is signally and operatively connected to a vehicle powertrain, and executes control schemes to control operation of an engine, a transmission and other torque machines, none of which are shown, to transmit tractive torque to the vehicle wheels in response to vehicle operating conditions and driver or operator inputs. The PCM 125 is shown as a single control module, but can include a plurality of control module devices operative to control various powertrain actuators, including the engine, transmission, torque machines, wheel motors, and other elements of a hybrid powertrain system, none of which are shown. The PCM 125 includes the adaptive cruise control system (ACC) 126 that controls vehicle braking and acceleration in response to operator control inputs detected using a human-machine interface (HMI) control module 124.

The VCM 128 is signally and operatively connected to a plurality of vehicle operating systems and executes control schemes to control operation thereof. The vehicle operating systems preferably include braking, stability control, and steering systems. The vehicle operating systems can also include other systems, e.g., HVAC, entertainment systems, communications systems, and anti-theft systems. The vehicle control module 128 is shown as single control module, but can include a plurality of control module devices operative to monitor systems and control various vehicle actuators. The VCM 128 includes the steering controller (STRG) 146 for vehicle lateral motion control. The steering controller 146 preferably includes an electrical power steering system (EPS) coupled with an active front steering system to augment or supplant operator input through a steering wheel 108 by controlling steering angle of the steerable wheels 160 during execution of an autonomic maneuver including a lane change maneuver. An exemplary active front steering system permits primary steering operation by the vehicle operator including augmenting steering wheel angle control when necessary to achieve a preferred steering angle and/or vehicle yaw angle. It is appreciated that the control methods described herein are applicable with modifications to vehicle steering control systems such as electrical power steering, four/rear wheel steering systems, and direct yaw control systems which control traction of each wheel to generate a yaw motion.

The passenger compartment of the subject vehicle 101 allows a vehicle operator to interact with the steering wheel 108, which is mounted on a steering column 109. An input device 110 is preferably mechanically mounted on the steering column 109 and signally connects to the human-machine interface (HMI) control module 124. Alternatively, the input device 110 can be mechanically mounted proximate to the steering column 109 in a location that is convenient to the vehicle operator. The input device 110, shown herein as a stalk projecting from column 109, includes an interface device by which the vehicle operator can command vehicle operation in an autonomic control mode, e.g., by commanding activation of autonomic vehicle control systems. The input device 110 preferably has control features and a location that is used by present turn-signal activation systems. Alternatively, other input devices, such as levers, switches, buttons, and voice recognition input devices can be used in place of or in addition to the input device 110.

The HMI control module 124 monitors operator requests and provides information to the operator including status of vehicle systems, service and maintenance information, and alerts commanding operator action. The HMI control module 124 signally connects to the communications bus 127 allowing communications with other control modules in the subject vehicle 101. With regard to the LXACC system 112, the HMI control module 124 is configured to monitor a signal output from the input device 110, discern an activation signal from the vehicle operator based upon the signal output from the input device 110, and communicate the activation signal to the communications bus 127. The HMI control module 124 is configured to monitor operator inputs to the steering wheel 108, an accelerator pedal and a brake pedal. It is appreciated that other HMI devices and systems can include vehicle LCD displays, audio feedback, haptic seats, and associated human response mechanisms in the form of knobs, buttons and audio response mechanisms.

The control architecture for the LXACC system 112 includes the LXACC core algorithm 12 described hereinabove for monitoring and controlling the subject vehicle 101 during ongoing operation. The LXACC core algorithm 12 includes the desired path generation processor 36 that generates a desired vehicle path and the vehicle path estimation and prediction processor 38 that estimates a vehicle path. The signals from the desired path generation processor 36 and the vehicle path estimation and prediction processor 38 are provided to the lane centering control module 40 and the lane changing control module 42. The lane centering control and lane changing control signals are provided to the HMI control module 124 to inform the operator of the lane change status using a display unit, haptic seat or warning chimes. Overall, the LXACC system 112 monitors signal outputs from the aforementioned remote sensing and detection devices associated with and signally connected to the spatial monitoring system 116. The LXACC system 112 executes an autonomic lane change mode when it receives an activation signal from the input device 110 via the HMI control module 124.

Figure 9:
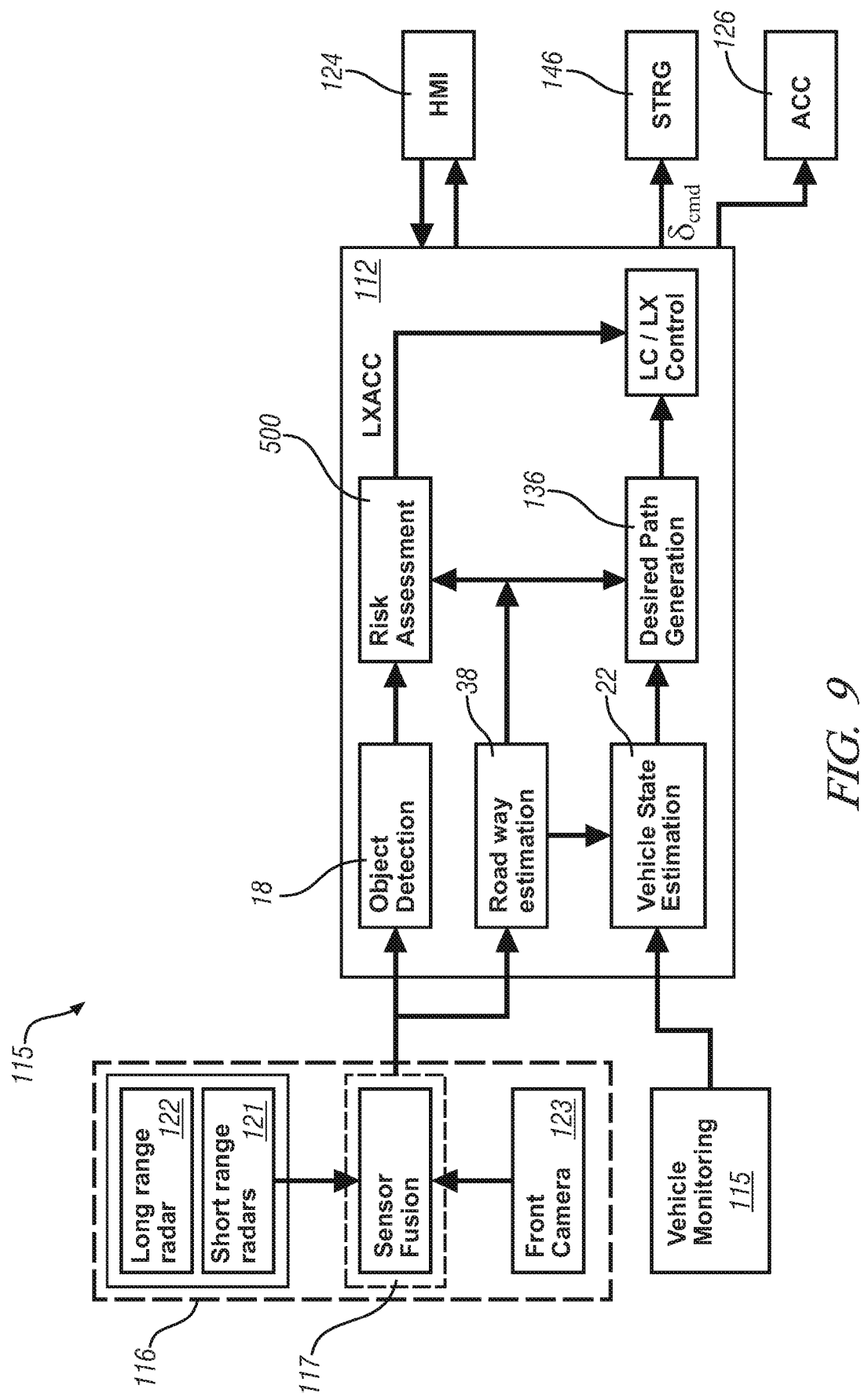
FIG. 9 schematically illustrates a control scheme for the autonomic control system including the lane change adaptive cruise control system that can be incorporated into the subject vehicle in accordance with the present disclosure.

FIG. 9 shows a control scheme for the autonomic control system including the LXACC system 112 that can be incorporated into the subject vehicle 101 described with reference to FIG. 8. The LXACC system 112 controls operation of the subject vehicle 101 in the autonomic control mode to execute a vehicle maneuver in response to an operator command without direct operator input to the primary vehicle controls, e.g., the steering wheel and accelerator and brake pedals. The LXACC system 112 executes in the autonomic control mode by monitoring the spatial monitoring system 116 and the vehicle monitoring system 115.

The spatial monitoring system 116 includes a fusion module 117 (Sensor Fusion) that executes algorithmic code to process the signal inputs generated using specific sensing devices of the spatial monitoring system 116 to generate fused objects including digital images representing remote object(s) including object vehicle(s) proximate to the subject vehicle 101.

The fusion module 117 generates fused objects including the digital images representing the remote objects proximate to the subject vehicle 101 using information from the forward vision camera 123, and the long range and short range radars 122 of the spatial monitoring system 116. The information can be in the form of the estimated range, range rate and azimuth location. The fusion module 117 tracks data for each of the objects including one or more object vehicle(s) to track them. The fusion module 117 reports the linear range, relative speed, and trajectory as a present longitudinal distance x, longitudinal relative speed u, and longitudinal relative acceleration $a_x$ relative to an XY-coordinate system oriented and referenced to the central axis of the subject vehicle 101 with the X axis parallel to the longitudinal trajectory thereof. The fusion module 117 integrates inputs from various sensing devices and generates a fused object list for each object vehicle(s) and other remote objects. The fused track includes a data estimate of relative location and trajectory of a remote object relative to the subject vehicle 101, in the form of a fused object list including position (x,y), velocity (Vx, Vy), object width, object type and lane, and a degree of confidence in the data estimate.

The fusion module 117 represents the roadway with reference to lateral offset(s) and heading angle(s) of object vehicle (s) with respect to the present driving lane. The signal inputs from the vehicle monitoring system 115 are used to estimate the vehicle motion states. On-board sensors coupled to the vehicle monitoring system 115, including inertial sensors such as rate gyro, speedometer, and steering angle sensor can be combined with the fusion module 117 to enhance the roadway profile prediction and the estimation of the vehicle motion states, including, e.g., lateral speed, yaw rate, lateral offset, and heading angle.

The spatial monitoring system 116 determines position, speed and trajectory of other vehicles and objects to identify a clearing sufficient to permit the subject vehicle 101 to maneuver into an adjacent travel lane. When there is a sufficient clearing for entry of the subject vehicle 101 into the adjacent travel lane, the spatial monitoring system 116 sends a signal indicating lane change availability to the LXACC system 112. Further, the spatial monitoring system 116 can send signals indicative of speed and location of other vehicles, for example, an object vehicle in the same travel lane directly in front of the subject vehicle 101 that can be used to control the speed of the subject vehicle 101 as part of operation of the adaptive cruise control system 126.

The LXACC system 112 uses the fused objects to project a path, or trajectory, for the remote object(s) (Object path prediction), e.g., each of one or more object vehicle(s) that are proximate to the subject vehicle 101. The LXACC system 112 uses the information from the spatial monitoring system 116 to estimate the roadway (roadway estimation) using the lane mark detection processor 74. The lane mark detection processor 74 uses the camera 123 to ongoingly monitor, recognize, and detect forward lane markings as part of estimating the roadway, as described hereinabove. The LXACC system 112 executes a collision risk assessment scheme 500 for each monitored object (Risk Assessment). The LXACC core algorithm 12 of the LXACC system 112 includes the desired path generation processor 36 that generates the desired vehicle path. The LXACC system 112 decides whether to execute and/or complete a commanded lane change maneuver based upon the collision risk assessment, and the desired vehicle path that is output from the desired path generation processor 36. This decision is communicated to lane centering control module 40 and the lane change control module 42 of the LXACC core algorithm 12 (LC/LX Control).

The lane centering control module 40 and the lane change control module 42 (LC/LX Control) generate control signals that are transmitted to the adaptive cruise control system (ACC) 126 and the steering controller (STRG) 146 to control speed and trajectory of the subject vehicle 101 to execute the desired vehicle maneuver. The LXACC system 112 can also alert the vehicle operator via the HMI control module (HMI) 124 subsequent to collision risk assessment.

Figure 10:
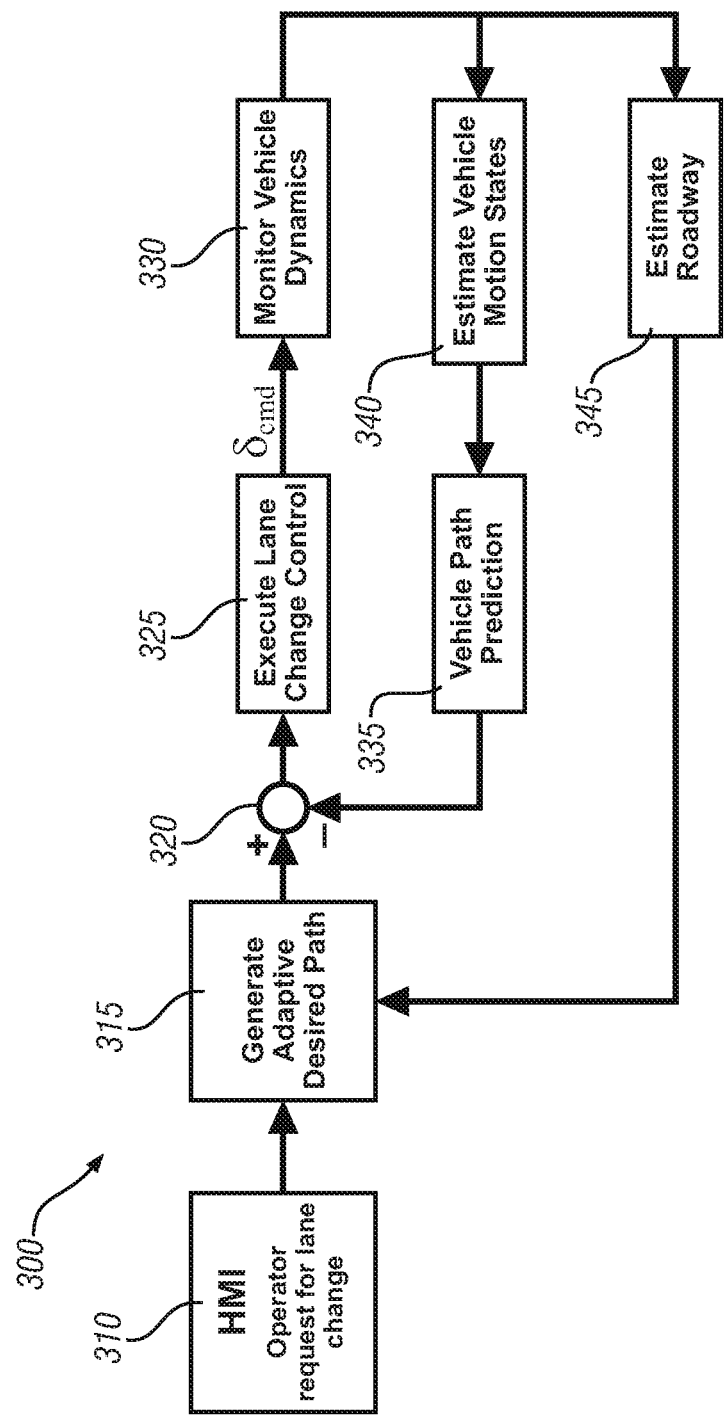
FIG. 10 schematically shows a control scheme for controlling the subject vehicle during execution of an autonomic lane change maneuver in accordance with the present disclosure.

FIG. 10 schematically shows a control scheme 300 for controlling the subject vehicle 101 during execution of an autonomic lane change maneuver. In operation, the vehicle operator initiates an autonomic lane change maneuver by requesting a lane change via the input device 110 of the HMI control module 124 (310). A desired or preferred travel path for the vehicle is generated and input to the LXACC system 112 (315). The LXACC system 112 compares the desired travel path with the predicted travel path (335), and commands vehicle operation to achieve the desired travel path (325). This includes generating and executing a preferred state for a vehicle control parameter, e.g., generating a steering command $\delta_{cmd}$ to achieve the desired travel path. Additionally or alternatively, a preferred state for vehicle acceleration can be commanded. Vehicle dynamics are monitored (330) from which present vehicle motion states, i.e., vehicle dynamics including vehicle speed, yaw rate, and the present steering angle of the steerable wheels are estimated (340). The present vehicle motion states are used to predict the travel path (Vehicle Path Prediction) using the vehicle path estimation and prediction processor 38 (335).

In addition, the roadway is estimated using the information from the spatial monitoring system 116 including using the lane mark detection processor 74 (Estimate Roadway) (345). The estimated roadway is used as feedback to update and adapt the desired travel path as it corresponds to the roadway (315). The adaptively generated travel path is used as feedback to adjust the desired travel path and control operation of the LXACC system 112 during execution of the autonomic lane change maneuver, thus affecting the steering command $\delta_{cmd}$.

The control scheme 300 generates the initial and adjusted desired vehicle paths for the lane change maneuver according to the present states for the vehicle dynamics and the detected lane markings. When the estimated vehicle motion states associated with the monitored vehicle dynamics indicate that a lateral acceleration in excess of a predetermined threshold is expected for the travel path, the control scheme 300 recalculates an adaptive desired path. The recalculated and adaptive desired path incorporates an extended control time for executing the lane change and/or a reduced vehicle speed. The LXACC system 112 generates a steering angle command that minimizes orientation and offset errors between the desired travel path and the estimated travel path. This includes determining a sequence of future steering angle commands. The travel path and lateral acceleration along the roadway are predicted using the steering commands above and the vehicle dynamic model, with accuracy of the vehicle path and acceleration prediction improved by integrating future steering angle commands. If the predicted lateral acceleration is large, the algorithm recalculates a desired travel path with relaxed conditions, including adjusting the steering command $\delta_{cmd}$ to mitigate the steering maneuvering and in some instances reducing vehicle speed to reduce lateral acceleration.

Figure 11:
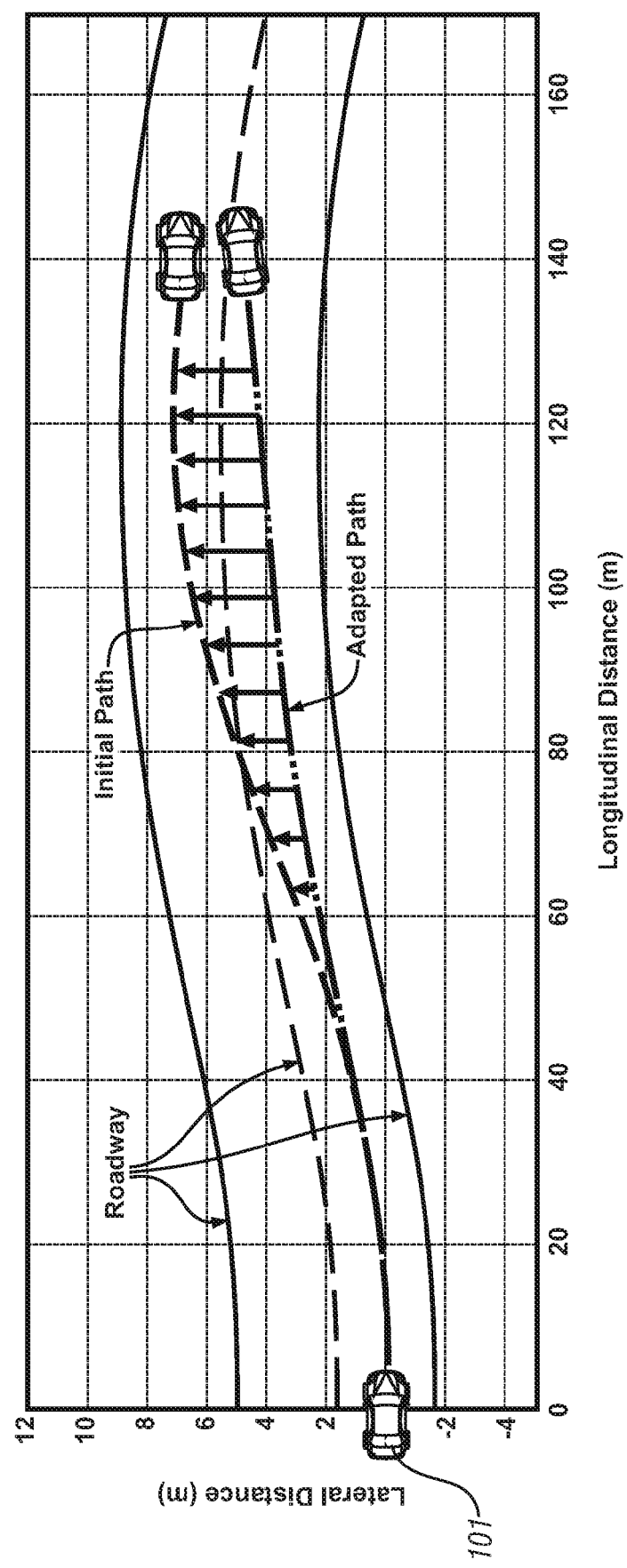
FIG. 11 graphically illustrates travel paths associated with operation of a subject vehicle traveling on a roadway during an autonomic lane change maneuver in accordance with the present disclosure.

FIG. 11 graphically illustrates travel paths associated with operation of a subject vehicle 101 traveling on a roadway, and is depicted in terms of longitudinal distances and lateral distances. An initial desired travel path (Initial Path) and a predicted travel path (Adapted Path) are shown. In response to a command to execute an autonomic lane change maneuver, the control scheme seeks to find a preferred sequence of steering angles $\delta(t)$ over a time interval [0, T], with T defined as the control time interval for executing the lane change to minimize a difference between the desired travel path and the predicted travel path, taking into account lateral acceleration. When excessive lateral acceleration is expected, the desired travel path can be recalculated using an extended control time interval, T+DT. When the recalculated steering commands based on the new desired travel path are not sufficient to reduce lateral acceleration to the predetermined threshold, the control scheme reduces vehicle speed.

Figure 12:
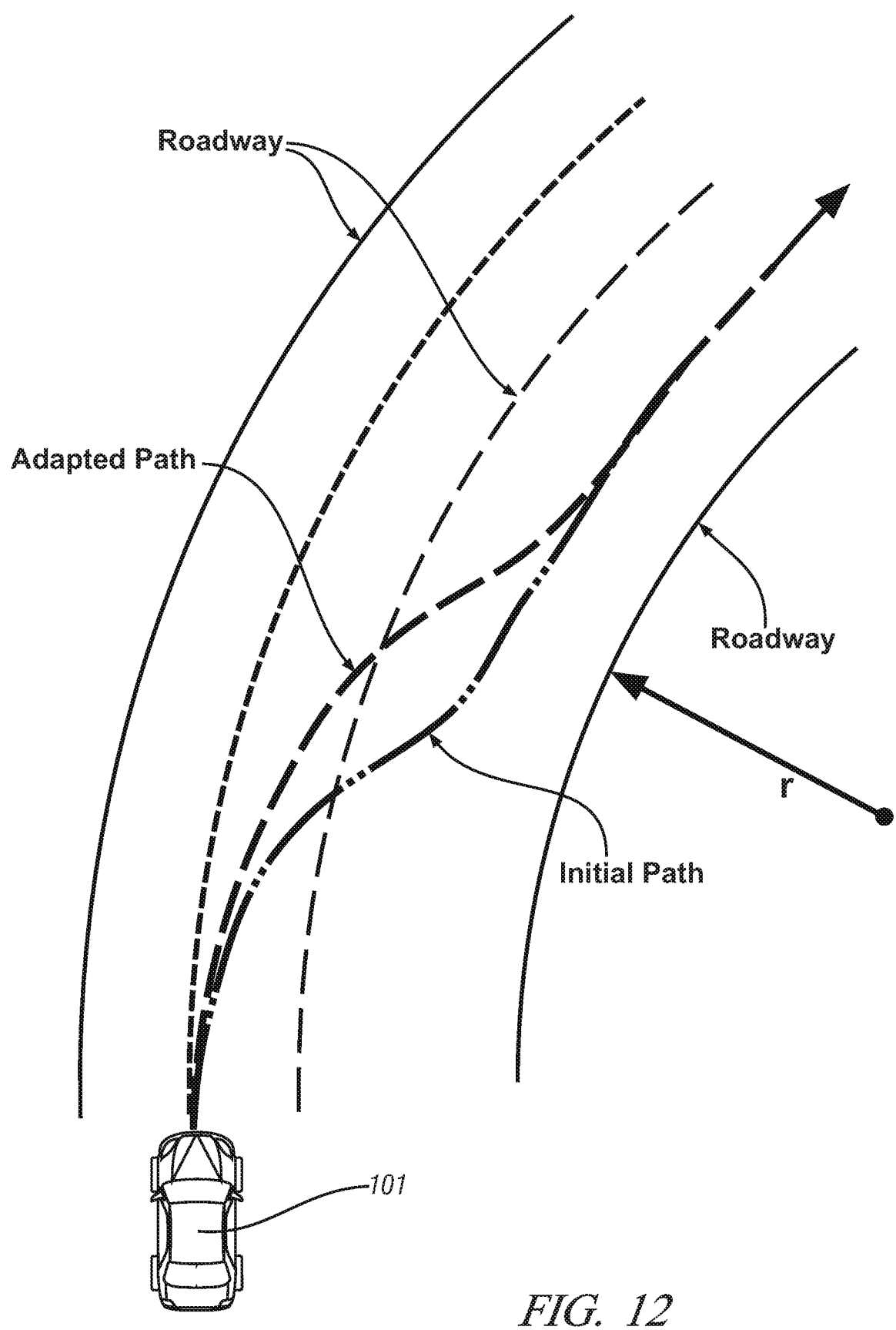
FIG. 12 graphically illustrates travel paths associated with operation of a subject vehicle traveling on a roadway including operating on a curved roadway using adaptive curve control during an autonomic lane change maneuver in accordance with the present disclosure.

FIG. 12 graphically illustrates initial and adapted travel paths associated with operation of a subject vehicle 101 traveling on a roadway, including operating on a curved roadway using adaptive curve control during an autonomic lane change maneuver. This includes generating the desired travel path for lane changing with the pre-specified control time interval T for executing the lane change (Initial Path). The desired travel path and the resulting lateral acceleration can be predicted as in Eq. 46

$$\dot{v}_y(t) = -\frac{C_f + C_r}{m \cdot v_x} \cdot v_y(t) + \left(\frac{b \cdot C_r - a \cdot C_f}{m \cdot v_x} - v_x\right) \cdot r(t) + \frac{C_f}{m} \cdot \delta_{cmd}(t) \quad [46]$$

wherein $\dot{v}_y(t)$ is rate of change in vehicle speed in the y direction, $v_x$ is the vehicle speed in the x direction, m is vehicle mass, $C_f$ and $C_r$ are centers of gravity in the forward and rear axle locations of the vehicle, a and b are constants, and r(t) is curvature, and $\delta_{cmd}(t)$ is the commanded steering angle.

Lateral acceleration $a_y$ can be determined as in Eq. 47.

$$a_y = v_x \cdot r(t) + \dot{v}_y(t) \quad [47]$$

The lateral acceleration is compared to a maximum or limit threshold for lateral acceleration. When the predicted lateral acceleration exceeds the limit threshold, i.e., $a_y > a_{y,limit}$, for the desired travel path, the control scheme adapts the desired travel path by recalculating with the control time interval T being extended to the control time interval, T+DT. The control scheme is executed to generate an adapted travel path that includes calculating a new adapted steering command associated with the extended control time interval, T+DT.

When the adapted steering command is not sufficient to maneuver the vehicle to achieve the lane change and reduce the lateral acceleration below the limit threshold for lateral acceleration, the control scheme adapts the travel path by reducing the vehicle speed according to Eq. 48:

$$v_{x,new} = \frac{a_{y,limit} - \dot{v}_y(t)}{r(t)} \quad [48]$$

The control scheme is executed to generate an adapted travel path that includes calculating a new adapted steering command associated with the extended control time interval, T+DT and the reduced vehicle speed (Adapted Path). The algorithm adapts the lane changing control to accommodate the road curvature and the reduced vehicle speed to enhance passenger comfort during an autonomic lane change maneuver on a curved roadway.

The control scheme incorporates vehicle lateral acceleration as one performance parameter of lane changing and lane centering control, so that an excessive lateral acceleration will be limited for improved passenger comfort. The control scheme improves the accuracy of vehicle lateral acceleration prediction by integrating the future steering angle commands and vehicle dynamic model. The accurate lateral acceleration improves future travel path prediction, facilitating more precise lane centering and lane changing control. The control scheme provides a decoupled tuning method to accommodate customer preferences, e.g., an operator-selectable sporty vs. comfort lane changing/centering control operation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a vehicle in response to an operator request for a lane change maneuver, the vehicle including a vehicle monitoring system for estimating vehicle motion states, a spatial monitoring system, an adaptive cruise control system for vehicle speed and acceleration control, a steering controller for vehicle lateral motion control, and an autonomic control system, the method comprising:
   generating a preferred travel path responsive to the operator request for a lane change maneuver;
   using the autonomic control system to command vehicle operation to achieve the preferred travel path;
   determining vehicle motion states;
   predicting a travel path associated with the vehicle motion states;
   adjusting the commanded vehicle operation to achieve the preferred travel path based upon the predicted travel path;
   estimating a roadway using the spatial monitoring system;
   adapting the preferred travel path responsive to the estimated roadway;
   determining a vehicle lateral acceleration state corresponding to the estimated roadway and the preferred travel path, wherein generating the preferred travel path is further responsive to a preferred lane change control time and adapting the preferred travel path is further responsive to the vehicle lateral acceleration state; and
   adjusting the preferred lane change control time responsive to the vehicle lateral acceleration state.

2. The method of claim 1, wherein adjusting the preferred lane change control time comprises extending the preferred lane change control time when the vehicle lateral acceleration state exceeds a threshold.

3. The method of claim 2, wherein adapting the preferred travel path is further responsive to the extended preferred lane change control time when the vehicle lateral acceleration state exceeds the threshold.

4. The method of claim 1, further comprising:
   generating a preferred steering command to achieve the adapted preferred travel path;
   wherein using the autonomic control system to command vehicle operation to achieve the preferred travel path comprises commanding the steering controller to execute the preferred steering command.

5. The method of claim 4, further comprising:
   generating a preferred vehicle acceleration command to achieve the adapted preferred travel path;
   wherein using the autonomic control system to command vehicle operation to achieve the preferred travel path comprises commanding the adaptive cruise control system to execute the preferred vehicle acceleration command.

6. The method of claim 1, wherein estimating the roadway using the spatial monitoring system comprises detecting lane marks.

7. Method for operating an autonomic control system of a vehicle, the vehicle including a vehicle monitoring system for estimating vehicle motion states, a spatial monitoring system, a steering controller, and an adaptive cruise control system, the method comprising:
generating a preferred travel path responsive to an operator request for a lane change maneuver;
estimating vehicle motion states and predicting a travel path associated with the vehicle motion states;
estimating a roadway using the spatial monitoring system;
adapting the preferred travel path responsive to the estimated roadway;
operating the autonomic control system to control the steering controller to achieve the adapted preferred travel path responsive to the predicted travel path;
operating of the autonomic control system to control the adaptive cruise control system to achieve the adapted preferred travel path responsive to the predicted travel path; and
adjusting a predetermined lane change control time responsive to the estimated roadway;
wherein generating the preferred travel path is further responsive to the predetermined lane change control time;
wherein adapting the preferred travel path is further responsive to the predetermined lane change control time;
wherein operating of the autonomic control system to control the steering controller and the adaptive cruise control system to achieve the adapted preferred travel path is further responsive to the estimated roadway and the predetermined lane change control time.

8. Method for operating an autonomic control system of a vehicle, the vehicle including a vehicle monitoring system for estimating vehicle motion states, a spatial monitoring system, and a steering controller, the method comprising:
generating a preferred travel path responsive to an operator request for a lane change maneuver;
estimating vehicle motion states and predicting a travel path associated with the vehicle motion states;
estimating a roadway using the spatial monitoring system;
adapting the preferred travel path responsive to the estimated roadway,
operating the autonomic control system to control the steering controller to achieve the preferred travel path responsive to the predicted travel path;
determining a vehicle lateral acceleration state corresponding to the estimated roadway and the preferred travel path, wherein generating the preferred travel path is further responsive to a preferred lane change control time and adapting the preferred travel path is further responsive to the vehicle lateral acceleration state; and
adjusting the preferred lane change control time responsive to the vehicle lateral acceleration state.

9. The method of claim 8, wherein adjusting the preferred lane change control time comprises extending the preferred lane change control time when the vehicle lateral acceleration state exceeds a threshold.

10. The method of claim 9, wherein adapting the preferred travel path is further responsive to the extended preferred lane change control time when the vehicle lateral acceleration state exceeds the threshold.

11. Method for controlling operation of a vehicle configured to execute an autonomic lane change maneuver, comprising:
estimating a roadway;
generating a preferred travel path, a path generation processor, in response to an operator request for a lane change maneuver and the estimated roadway;
estimating a first vehicle lateral acceleration state corresponding to the preferred travel path;
adapting the preferred travel path when the first vehicle lateral acceleration state exceeds a threshold;
determining a second vehicle lateral acceleration state corresponding to the adapted preferred travel path; and
reducing vehicle speed when the second vehicle lateral acceleration state exceeds the threshold.

12. The method of claim 11, wherein generating the preferred travel path is additionally in response to a preferred lane change control time.

13. The method of claim 12, further comprising extending the preferred lane change control time wherein adapting the preferred travel path is in response to the extended preferred lane change control time.

14. The method of claim 13, wherein determining the second vehicle lateral acceleration state is in response to the extended preferred lane change control time.

15. The method of claim 14, further comprising operating an autonomic control system to control a steering controller to execute a steering command responsive to the adapted preferred travel path.

16. The method of claim 15, wherein reducing vehicle speed when the second vehicle lateral acceleration state exceeds the threshold comprises operating the autonomic control system to reduce vehicle speed in response to the adapted preferred travel path.

* * * * *